Oct. 9, 1956 A. B. BOLENDER 2,765,529
METHODS OF FORMING SPLINES IN BORES OF MACHINE ELEMENTS
Original Filed July 21, 1953 2 Sheets-Sheet 1
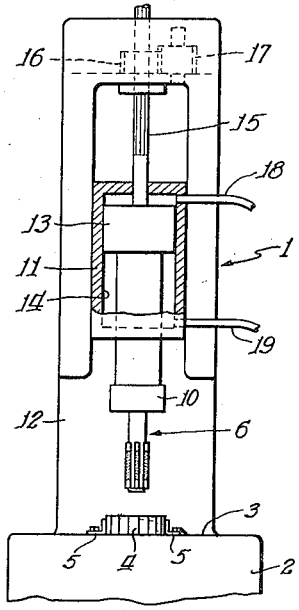
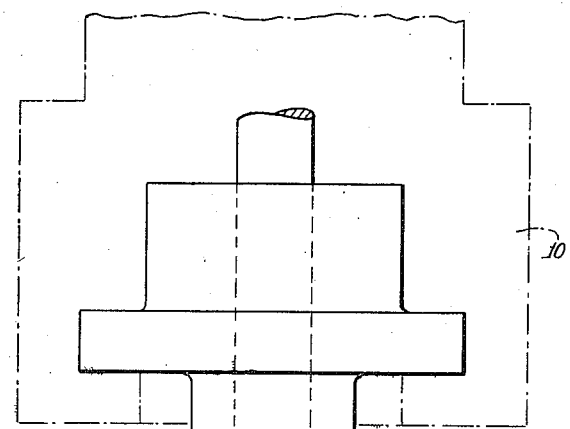
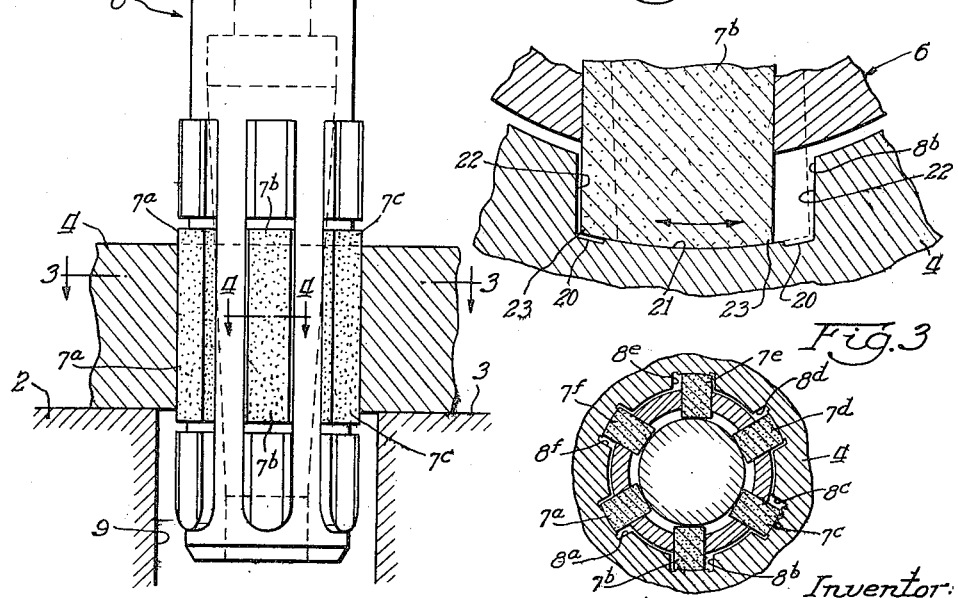
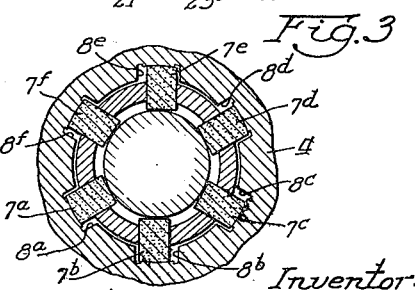
Inventor:
Augustus B. Bolender Oct. 9, 1956　　　　　　　A. B. BOLENDER　　　　　2,765,529
METHODS OF FORMING SPLINES IN BORES OF MACHINE ELEMENTS
Original Filed July 21, 1953　　　　　　　　　　2 Sheets-Sheet 2
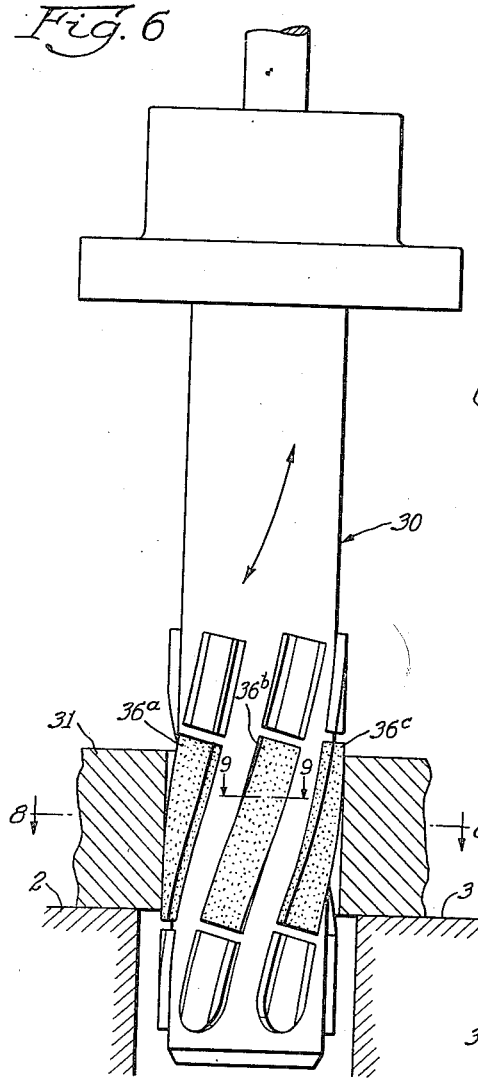
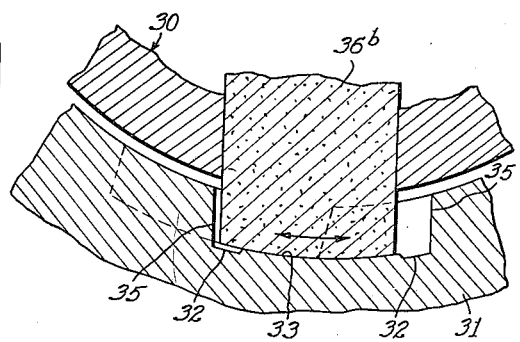
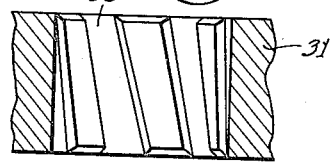
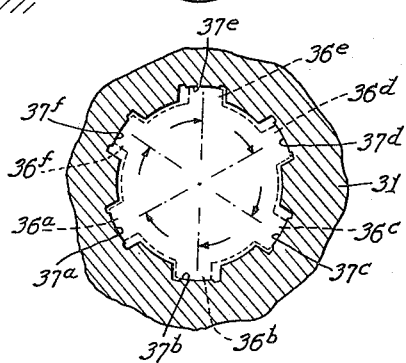
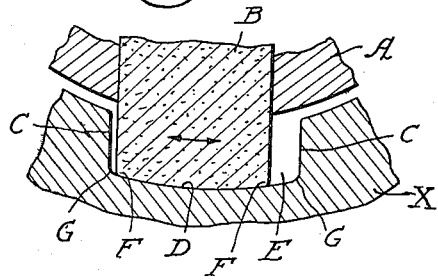
Inventor:
Augustus B. Bolender

United States Patent Office 2,765,529
Patented Oct. 9, 1956

2,765,529

METHODS OF FORMING SPLINES IN BORES OF MACHINE ELEMENTS

Augustus B. Bolender, Muncie, Ind., assignor to Borg-Warner Corporation, Chicago, Ill., a corporation of Illinois Continuation of abandoned application Serial No. 25,846, May 8, 1948. This application May 11, 1953, Serial No. 354,241

3 Claims. (Cl. 29—558)

This invention relates to machine elements, such as gears and other elements of steel, having splined bores and two methods of forming splines in the bores of such elements.

This application is a continuation of my application for "Machine Elements and Methods of Forming Splines in Bores Thereof," Serial No. 25,846, filed May 8, 1948, now abandoned.

In a gear having internal splines in its final form, the gear is preferably splined by broaching before heat treating, and the gear may be finished internally by a final sizing broach after hardening by heat treatment of the gears. This manner of forming splines in gears is desirable as, in the heat treatment of the gears, there is some distortion and change in diameters of the bores of the gears and, for this reason, it has been found desirable to finish the internal splines of the gears by a final sizing broaching after hardening. However, in order to satisfactorily perform the final sizing broach, it is necessary that the heat treatment be controlled so that the bores of the gears will be of some hardness less than that of the outer surfaces of the gears and soft enough to permit the final broaching operation. In view of this requirement, it has been determined that the internal splines of the gear in its final form are not of sufficient hardness to resist wear in service.

To form the splines of gears with satisfactory wear resistance, it has been proposed that the gear be splined by broaching before heat treating, then the gear be heat treated, and thereafter the splines of the gear be finished internally by honing the bore of the gear with abrasive stone sticks disposed within the splineways of the gear, the abrasive stone sticks being attached to a honing tool reciprocated axially of the gear to finish the splines of the gear. By this manner of internally finishing the gear, the gear may be heat treated to obtain sufficient hardness to make the gear, including the internal splines of the gear, sufficiently hard to resist wear in service. It is, therefore, apparent that finishing the internal splines of the gear by a honing operation is more desirable than by a final sizing broaching operation.

In the honing operation to finish the internal diameters of the gears, the abrasive stone sticks are disposed in the splineways in the bore of the gear, and each stick engages the two opposed surfaces of a splineway and the transverse connecting surface defining the bottom of the splineway, the opposed surfaces being substantially perpendicular to the connecting wall whereby corners are formed at the juncture of the opposed surfaces and the connecting surface. During the honing operation, it has been found that the corners of the abrasive stone stick break down and wear more rapidly than the other abrading portions of the stick, with the result that small fillets will be produced at the corners of the splineways of the gear and this, in turn, will interfere with the proper fitting of the splines on a matching shaft in the splineways in the gear. Such breakdown of the corners of the stone stick is due to the fact that the grains of the stone at the corners of the stick are not supported as well as the grains on the flat abrading surfaces of the stone stick. As this breakdown of the corners of the sticks appears to be irremediable, the need arises for broaching the splineways in the gear in a manner so that the corners of the splineways will not cause the granular structure at the corners of the stick to be disrupted and wear more rapidly than the abrading portions of the stick during the honing operation.

It is, therefore, an object of the present invention to provide machine elements, such as gears and other elements of steel, having splineways formed in such manner that breaking down of the corners of abrasive stone sticks is avoided during the honing operation.

To this end, it is an object of the present invention to provide a machine element, such as gears and other elements of steel, having splineways with the corners thereof formed with reliefs to provide clearances for the corners of the hone stone sticks during the honing operation.

In the finishing of the splineways of gears by a honing operation as described, in the event the bore of the gear is of varying diameter, i. e. out of round, some of the abrasive stone sticks will wear more rapidly than the other stone sticks, with consequent reduction of the useful life of the stone sticks having the increased wear.

It is, therefore, another object of my invention to provide a method for indexing the honing tool during the honing operation so that the abrasive sticks, carried by the honing tool, will be periodically disposed in different splineways of the gear than those previously occupied, and thereby each stick performs only a portion of the finishing honing operation of the splineways of the gear, each of the abrasive sticks thus being uniformly worn during the honing operation.

Other objects, advantages and uses of the invention will become more apparent after reading the following specification and claims and after consideration of the drawings forming a part of this specification, wherein:

Fig. 1 is a front elevational view, partially in section, of honing apparatus in which the method of the invention is illustrated as being practiced;

Fig. 2 is a detail view on an enlarged scale of a portion of the apparatus and illustrating the honing tool having its associated abrasive stone sticks disposed in the splineways of a workpiece;

Fig. 3 is a sectional view of the workpiece and the honing tool taken on line 3—3 of Fig. 2;

Fig. 4 is a sectional view taken on line 4—4 of Fig. 2;

Fig. 5 is a sectional view, similar to Fig. 4, and illustrating a machine element with a splineway formed therein in accordance with prior art practice;

Fig. 6 is a view similar to Fig. 2 but illustrating a honing tool used to finish the helical splineways of a workpiece, Fig. 7 is a sectional view through the workpiece illustrating the helical splineways in the workpiece;

Fig. 8 is a sectional view taken on line 8—8 of Fig. 6; and

Fig. 9 is an enlarged sectional view taken on line 9—9 of Fig. 6.

The drawings are to be understood as being more or less of a schematic character for the purpose of disclosing typical or preferred embodiments of the improvements contemplated herein, and in the drawings like reference characters identify the same parts wherever these parts appear in the different views.

In the practice of the method of the invention, I may use the apparatus shown in Fig. 1 which is adapted to be used for practicing the method of my invention, this apparatus being one of the many well known types of honing machines on the market and comprising, briefly, a honing machine generally indicated at 1 and having a base 2 providing an upper workpiece-holding area 3, and on which a workpiece in the form of a gear 4 is releasably fixed thereto by means of fastening devices such as the clamps 5 bolted to the base 2. The honing tool 6 is disposed above the gear 4, with the axis of the honing tool in alignment with the axis of the gear. The honing tool is of well known design and is a tubular member having slots in its outer circumferential cylindrical surface receiving six abrasive stone sticks 7a to 7f, inclusive, and having internal mechanisms (not shown) which may be in the form of springs for urging the stone sticks radially of the honing tool into the splineways 8a to 8f, inclusive, of the gear 4 as shown. The work table of the base 2 is provided with a cylindrical recess 9 for receiving the end of the honing tool as shown in Figs. 2 and 6, during the honing operation.

The honing tool 6 is releasably fixed to a driver 10 in any well known manner. The driver 10 extends within a vertical cylinder 11, which cylinder is integrally connected to the base 2 by a standard 12. As shown in Fig. 1, the driver 10 has connected thereto a piston 13 received within the cylindrical chamber 14 of the member 11. The driver 10 further comprises a rod 15 secured to the piston 13 and extending outwardly of the upper end wall of the cylinder 11. The outer end of the rod 15, extending upwardly of the cylinder 11, is splined to receive a gear 16 meshing with a gear 17, the gear 17 being connected to a suitable power mechanism which may be energized to rotate the gear 17 and thereby the gear 16 for the purpose of rotating the honing tool 6 for a purpose described hereinafter. A plurality of conduits 18, 19 extend through the cylinder 11 and are disposed respectively above and below the piston 13 to alternately conduct a suitable fluid medium under pressure to the upper or lower ends of the piston 13 to cause vertical reciprocation of the piston 13 and thereby the tool 6 during the honing operation.

In the manufacture of machine elements, such as gears and other elements having internal splineways, it is necessary that the splineways be accurately finished within close limits so that the gears may be fitted on the matching shaft and, also, without chafing of the shaft. In the finishing of the splineways of the gear by a honing operation and referring to Fig. 5, the heretofore conventional practice in making the splineways in the bore of a gear X was to roughly form the splineways by a broaching operation and thereafter to finish the splineways in the gear by a honing operation in which a honing tool A identical to the tool 6 and carrying abrasive stone sticks (one of which is indicated at B) was reciprocated along its axis and periodically rotated about its axis to engage one or the other of the sides of the abrasive stone sticks with the surfaces C and D of the splineway indicated at E in the gear X, one side C of the splineway being engaged by the abrasive stick B on the down stroke of the honing tool and the other side C of the splineway being engaged by the stick during the upward movement of the honing tool, the surface D of the splineway being continually engaged with the end of the abrasive stone stick. In the operation of broaching splineways in the gear, the splineways were formed so that each of the opposed surfaces C, C of the splineway at its juncture with the connecting surface D, extending between and connecting the surfaces C, C at the bottom of the splineway, formed a sharp corner. Due to the fact that the grains of the abrasive material forming the stone stick B at the corners, indicated at F in Fig. 5, of the stone stick are not supported as well as the grains forming the abrading surfaces of the stick, the stick breaks down faster on these corners F than it does on either its sides or outer diameter, with the consequence that the stone stick is incapable of satisfactorily honing the corners of the splineway which results in fillets G, G being produced at the corners of the splineway interfering with the fitting of the gear on a matching shaft.

My invention satisfactorily solves this problem, referring to Figs. 3 and 4, by forming the splineways 8a to 8f, inclusive, in the broaching operation so that longitudinal reliefs 20, 20 are formed in the surface 21, connecting the opposed surfaces 22, 22 of the splineway, whereby during the honing operation, the corners 23, 23 of the abrasive stone stick 7b are not engageable with the ends of the surface 21 of the splineway. Accordingly, the provision of the reliefs 20, 20 in the surface 21 at its juncture with the surfaces 22, 22 of the splineway prevents the breaking down of the corners of the stone and the formation of fillets in the corners of the splineway, with the consequence, each splineway may be finished by a honing operation in a manner which will insure the gear properly fitting on the matching shaft.

In order to produce more accurately finished splineways within close limits, my invention contemplates methods of indexing the honing tool 6 to rotate the tool 6 to position each of the honing sticks carried thereby periodically and for a short time in different splineways of the machine element, such as the gear 4, during the finishing honing operation. I have found that this materially improves the quality of the finished splineways and is particularly advantageous when the bore of the machine element or gear 4 may have a varying diameter, i. e. out of round, as the indexing of the honing tool 6 with relation to the gear prevents excessive wear of the abrasive stone sticks.

My method of indexing the honing tool is equally applicable to gears having straight splineways, as shown in Figs. 2 to 4, inclusive, and also to gears having spiral splineways, as shown in Figs. 6 to 9, inclusive.

Referring first to Figs. 1 to 4, illustrating my method practiced to hone straight splineways of gears, the honing tool 6 is rotated by the gears 16 and 17 during this indexing operation. Referring to Fig. 3, it will be noted that the abrasive stone sticks 7a to 7f, inclusive, are respectively received within splineways 8a to 8f, inclusive, of the gear 4. It will be assumed that this condition prevails at the beginning of the honing operation and at such time the honing tool 6 is reciprocated for a short time, such as a few seconds, and thereafter raised above the gear 4 and rotated, this indexing operation causing the abrasive stick 7a to be disposed in the splineway 8b and the other stone sticks 7b to 7f will thereupon be respectively disposed in the splineways 8c to 8a, inclusive. The tool holder 6 is then reciprocated for a few seconds and then raised above the gear and rotated. Upon movement of the tool holder 6 in a downward direction, the abrasive stone stick 7a will be positioned in the splineway 8c of the gear and, accordingly, the other abrasive sticks 7b to 7f will be positioned in the splineways 8d to 8b of the gear in the order named. The honing tool may thereafter be successively indexed at predetermined time intervals, for example, three seconds, until six indexing operations of the tool have been made whereby each of the six abrasive stone sticks have contacted all of the splineways in the gear 4. It may be noted that satisfactory finishing of the bore of the gear in the honing operation may be obtained by a lesser number of indexing apertures of the honing tool. It will be apparent that my method is also particularly advantageous in the event the bore of the gear is out of round as indexing the honing tool with relation to the gear 4 will prevent excessive wear of one or more of these stone sticks.

Referring now to Figs. 6 to 9, inclusive, it will be seen that my invention is equally applicable to the finishing of helical splineways of machine elements, such as the gear 31, by a honing operation. Referring to Fig. 6, the honing tool 30 is shown disposed within the bore of a gear 31, and it may be noted, by reference to Figs. 8 and 9, that the gear 31 is provided with reliefs 32, 32 in the surface 33 of each helical splineway thereof at its juncture with the opposed surfaces 35, 35 of the splineway to prevent the corners of the abrasive stone stick from wearing more rapidly than the sides and outer diameter of the stick. The helical abrasive stone sticks 36a to 36f, inclusive, are respectively received within the splineways 37a to 37f, inclusive, of the gear 31. It will be noted from an inspection of Fig. 9 that each of the abrasive stone sticks is of substantially less width than the width of the associated splineway so that one and then the other of the opposed surfaces 35, 35 of the splineway will be engaged by the adjacent sides of the abrasive stone stick upon axial reciprocation of the tool holder 30. It may be noted that the tool holder 30 need not be rotated to effect this periodic engagement of the respective sides of the stone stick with the sides of the splineway because of the helical conformation of the abrasive stone stick and the splineway of the gear are effective to cause each of the abrasive stone sticks to engage one side thereof with the adjacent side of the associated splineway when the tool holder is moved in an upward direction and to engage the other side of the stone stick with the adjacent side of the splineway when the honing tool is moved in the opposite direction. It will thus be apparent that a uniform honing action of the splineways is obtained, as well as uniform wear of the abrasive stone sticks.

In view of this action of the helical sticks and splineways of the gear, the honing tool 30 need not be periodically rotated in opposite directions by the gears 16 and 17 as was required in the honing of the straight splineways 8a to 8f, inclusive, of the gear 4, as described, and the gears 16, 17 need only be rotated by suitable power means during the practice of my method of indexing the tool holder to position the helical abrasive stone sticks 36a to 36f, inclusive, successively in different helical splineways of the gear 30 in the same manner as previously described. It will be apparent that the honing tool may be indexed periodically to position each of the stone sticks in a different splineway of the gear than that previously occupied to insure finish honing of the splineways within close tolerances, as well as to prevent undue wear of certain of the sticks in the event the bore of the gear is out of round.

Where the term "relief" is used herein in the specification and claims, that term should be construed to mean a recess extending outwardly from the outer diametrical surface of the bore.

I wish it to be understood that my invention is not to be limited to the specific constructions, arrangements, and methods hereinbefore described, except only insofar as the claims may be so limited, as it will be understood to those skilled in the art that changes may be made without departing from the principles of the invention. In particular, I wish it to be understood that, although I have shown and described gears having straight and helical splineways to which my invention is particularly applicable, my invention is also suitable for use with any other machine element having straight or helical splineways internally thereof which have been roughly cut or formed by broaching and the like and requiring finishing by a honing operation.

I claim:

1. The method of forming splineways in a bore of a machine element comprising the steps of roughly shaping splineways in the bore of the machine element each having an outer diametrical surface and opposed side surfaces on the sides of the diametrical surface, forming reliefs in the outer diametrical surface of each splineway at the juncture of said surface with the opposed side surfaces of the splineway, inserting a honing tool within the bore of the element, said honing tool having portions of abrasive material with external diametrical surfaces of substantially the same cross sectional shape as the diametrical surfaces of said bore to make a surface to surface contact therewith and with side portions on opposite sides of each of the external diametrical portions and forming corners therewith, each of said abrasive portions being of less width than the width of the splineway in which the abrasive portion is disposed, reciprocating the honing tool axially of the bore of the machine element with the external diametrical surfaces of said abrasive portions engaging and honing the outer diametrical surfaces of the splineways, and oscillating the tool during such reciprocations so that each of the abrasive portions overlies first one of the reliefs in the splineway in which it is disposed and then the other relief of the splineway for causing a uniform wearing of the outer surfaces of the abrasive portions and for preventing a breakdown of said abrasive portions at their said corners.

2. The method of forming splineways in a bore of a machine element comprising the steps of roughly shaping splineways in the bore of the machine element each having an outer diametrical surface and opposed side surfaces on the sides of the diametrical surface, forming reliefs in the outer diametrical surface of each splineway, at the juncture of said surface with the opposed side surfaces of the splineway inserting a honing tool within the bore of the element, said honing tool carrying sticks of abrasive stone having external diametrical surfaces of substantially the same cross sectional shape as the diametrical surfaces of said bore to make a surface to surface contact therewith and having side portions on opposite sides of each of the external diametrical portions and forming corners therewith, each stick being of less width than the splineway in which the stick is disposed but being greater in width than one-half the width of the splineway, reciprocating the honing tool axially of the bore of the machine element with the external diametrical surfaces of the sticks engaging and honing the outer diametrical surfaces of the splineways, and oscillating the tool during such reciprocations so that each stick overlies one of the reliefs in its splineway for one direction of reciprocation and overlies the other relief of the splineway for the other direction of reciprocation for causing a uniform wearing of the outer surfaces of the abrasive sticks and for preventing a breakdown of said sticks at their said corners.

3. The method of forming splineways in a bore of a machine element comprising the steps of roughly shaping splineways in the bore of the machine element each having an outer diametrical surface and opposed side surfaces on the sides of the diametrical surface; forming reliefs in the outer diametrical surface of each splineway at the juncture of said surface with the opposed side surfaces of the splineway; inserting a honing tool within the bore of the element; said honing tool carrying sticks of abrasive stone having external diametrical surfaces of substantially the same cross sectional shape as the diametrical surfaces of said bore to make a surface to surface contact therewith and having side portions on opposite sides of each of the external diametrical portions and forming corners therewith; each stick being of less width than the splineway in which the stick is disposed but being greater in width than one-half the width of the splineway; reciprocating the honing tool axially of the bore of the machine element with the external diametrical surfaces of the sticks engaging and honing the outer diametrical surfaces of the splineways; oscillating the tool during such reciprocations so that each stick overlies one of the reliefs in its splineway for one direction of reciprocation and overlies the other relief of the splineway for the other direction of reciprocation; and successively removing the honing tool from the machine element, reinserting the honing tool within the machine element in a changed rotative indexed position with respect to the machine element with different abrasive sticks being within the respective splineways of the machine element and reciprocating and oscillating the honing tool in the same manner as mentioned for each of the different indexed positions of the tool for causing a uniform wearing of the outer surfaces of the abrasive sticks and for preventing a breakdown of the abrasive sticks at their said corners.

References Cited in the file of this patent

UNITED STATES PATENTS

| | | |
|---|---|---|
| 1,586,990 | Harrison | June 1, 1926 |
| 1,683,868 | Copland | Sept. 11, 1928 |
| 1,684,872 | Logue | Sept. 18, 1929 |
| 1,988,025 | Trendell | Jan. 15, 1935 |
| 2,038,554 | Edgar | Apr. 28, 1936 |
| 2,049,127 | Mayback | July 28, 1936 |
| 2,077,100 | Edgar | Apr. 13, 1937 |
| 2,169,841 | Hollstin | Aug. 15, 1939 |
| 2,380,317 | Kline | July 10, 1945 |